(12) United States Patent
Ellingsworth

(10) Patent No.: US 6,819,009 B2
(45) Date of Patent: Nov. 16, 2004

(54) METHOD AND APPARATUS FOR PREVENTING UNAUTHORIZED ACCESS TO A VEHICLE

(76) Inventor: Carl Ellingsworth, 825 Campbell Street, Ottawa, Ontario (CA), K2A 2C4

( * ) Notice: Subject to any disclaimer, the term of this patent is extended or adjusted under 35 U.S.C. 154(b) by 183 days.

(21) Appl. No.: 09/832,979

(22) Filed: Apr. 12, 2001

(65) Prior Publication Data

US 2002/0024260 A1 Feb. 28, 2002

Related U.S. Application Data

(60) Provisional application No. 60/196,301, filed on Apr. 12, 2000.

(51) Int. Cl.$^7$ .............................................. B60R 25/00
(52) U.S. Cl. ...................... 307/10.3; 180/287; 70/57.1
(58) Field of Search .............................. 307/10.2, 10.3, 307/10.4; 70/57.1, 177, 202, 237, 255, 258; 123/179.3, 179.4, 179.25; 180/287

(56) References Cited

U.S. PATENT DOCUMENTS

| | | | | |
|---|---|---|---|---|
| 2,892,110 A | * | 6/1959 | Phelon et al. ................. 310/153 |
| 3,634,724 A | | 1/1972 | Vest ............................ 315/209 |
| 3,675,036 A | | 7/1972 | Davies ..................... 307/10 AT |
| 4,074,672 A | * | 2/1978 | LaDue et al. ........... 123/198 DC |
| 4,155,420 A | * | 5/1979 | Staver ........................ 307/10.2 |
| 4,209,709 A | * | 6/1980 | Betton ........................ 307/10.4 |
| 4,213,436 A | | 7/1980 | Burson ........................ 123/599 |
| 4,292,541 A | * | 9/1981 | Ambrosius .................. 180/287 |
| 4,292,609 A | * | 9/1981 | Feldman et al. ............. 333/165 |
| 4,300,495 A | * | 11/1981 | Trevino et al. .............. 180/287 |
| 4,501,256 A | | 2/1985 | Dykstra ....................... 123/651 |
| 4,665,725 A | * | 5/1987 | Machcinski .................. 70/255 |
| 5,006,843 A | * | 4/1991 | Hauer ........................ 307/10.4 |
| 5,138,986 A | * | 8/1992 | Aguilar ....................... 307/10.4 |
| 5,237,970 A | * | 8/1993 | Weis .......................... 307/10.3 |
| 5,353,006 A | * | 10/1994 | Aguilar ....................... 307/10.3 |
| 5,412,378 A | * | 5/1995 | Clemens ..................... 307/10.2 |
| 5,492,087 A | * | 2/1996 | Rolland, Jr. ................. 307/10.3 |
| 5,524,597 A | | 6/1996 | Hiki et al. ................... 123/635 |
| 5,554,891 A | * | 9/1996 | Shimizu et al. ............. 307/10.2 |
| 5,630,404 A | | 5/1997 | Regazzi et al. .............. 123/602 |
| 5,635,801 A | | 6/1997 | Regazzi et al. ......... 315/209 CD |
| 5,844,469 A | | 12/1998 | Regazzi et al. .............. 340/426 |
| 5,886,420 A | * | 3/1999 | Regalado .................... 307/10.3 |
| 5,927,240 A | * | 7/1999 | Maxon ....................... 307/10.4 |
| 5,942,807 A | * | 8/1999 | Armanca ..................... 307/10.2 |
| 5,973,411 A | * | 10/1999 | Tado et al. .................. 307/10.4 |
| 6,058,902 A | * | 5/2000 | Jacobs et al. .......... 123/198 DC |
| 6,077,133 A | * | 6/2000 | Kojima et al. .................. 440/1 |
| 6,111,393 A | | 8/2000 | Regazzi et al. .............. 323/243 |
| 6,227,158 B1 | * | 5/2001 | LaBelle ....................... 307/10.3 |

FOREIGN PATENT DOCUMENTS

| | | | | |
|---|---|---|---|---|
| EP | 0 610 902 | | 2/1994 | ........... B60R/25/00 |
| EP | 0 771 703 | | 10/1996 | ........... B60R/25/04 |
| EP | 0 904 996 A1 | | 3/1999 | |
| KR | 2003030793 | * | 4/2003 | ........... B60R/25/04 |
| WO | WO 81/03002 | * | 10/1981 | ........... B60R/25/04 |

* cited by examiner

*Primary Examiner*—Gregory J. Toatley, Jr.
(74) *Attorney, Agent, or Firm*—Paul S. Sharpe; Ogilvy Renault

(57) ABSTRACT

A method for prevent unauthorized access to a vehicle is disclosed. The method includes apparatus which is positioned within a known motor housing and actuatable only within the motor housing. In one embodiment, an ignition generator coil interrupt circuit is provided and mounted directly within the housing of the motor. A switch is connected to the circuit which allows power interruption to the ignition generator coil. When the switch is activated power interruption of said ignition generator coil is achieved to disable the engine from starting. Conveniently, the interrupt circuit is positioned entirely within the housing and therefore inaccessible for tampering. In another embodiment a switch circuit is positioned between an ECM motherboard and sensors typically associate with an automobile engine. This circuit is useful for arrangements which do not include a magneto/stator arrangement.

23 Claims, 5 Drawing Sheets

METHOD AND APPARATUS FOR PREVENTING UNAUTHORIZED ACCESS TO A VEHICLE

CROSS-REFERENCE TO RELATED APPLICATIONS

This application claims the benefit of U.S. patent application Ser. No. 60/196,301, filed Apr. 12, 2000.

FIELD OF THE INVENTION

The present invention relates to an apparatus and method for preventing unauthorized access to a vehicle and more particularly, the present invention relates to a device for preventing the theft of a vehicle.

BACKGROUND OF THE INVENTION

Generally speaking, the theft of vehicles such as snowmobiles, ATVs, watercrafts, motorcycles and other vehicles having a magneto/stator present in the motor system is fairly straightforward, much to the demise of the owners of such vehicles. This is also a problem for automobiles despite the fact that they do not include a magneto or stator.

The simplicity in, for example, starting the motors of these vehicles is realized by the arrangements used to link the ignition system to the ignition generator coil. In snowmobiles, for example, the block connectors electrically connect the ignition switch, kill switch and power accessories to the ignition switch. These elements are all exposed outwardly of the motor. To the skilled thief, since these elements are readily accessible, bypass is simple and can typically be achieved in seconds. The result is that the vehicle can be easily started and driven away with ease and with a minimum of effort.

In an attempt to speak to the escalation in theft of these vehicles, many devices have been proposed in the art which attempt to provide the user/owner with a greater degree of security. The arrangements known incorporate alarms, key-lock systems, manual circuit interrupts inter alia. These devices, although somewhat useful, are all limited by the same vulnerability, namely the fact that they are external systems which are accessible by a thief and therefore are easily disabled by bypass or "hot wiring".

In the case of snowmobiles, track locks have been proposed. These devices are simply not pragmatic; the user is confined to carrying these bulky awkward items on the snowmobile which requires storage space. This space is often at a premium in view of the size of the snowmobile.

A current manufacturer has offered a digital system (for selected models) and even though its method has a level of effectiveness, it is still vulnerable by its external application. Accordingly, the owner of earlier model vehicles is not helped by the new technology.

Other systems for preventing theft of watercraft include markings on the craft itself or special indications on the hull identification plate. These attempts at preventing theft can be easily circumvented by simply removing and replacing the plates or altering the information thereon.

In terms of automobiles, steering wheel arrangements such as the Club™ are typically employed. These devices are somewhat useful, but are easily removable by determined thieves.

Immobilizers are also used in automobiles for theft prevention, but are limited by their external disposition.

In view of the fact that the vehicles are expensive, a more sophisticated method and apparatus is required which is not external of the motor or engine and which does not employ interceptable digital streams.

The present invention addresses this need and thus one object of one embodiment of the present invention is internal and therefore offers a security system which is substantially inaccessible to tampering.

SUMMARY OF THE INVENTION

One object of the present invention is to provide an improved apparatus and method for preventing unauthorized access to and ultimately the theft of a vehicle.

A further object of the present Invention is to provide a method for preventing unauthorized access to a vehicle having a motor, a power source for the motor, a magneto and a stator housed within a housing and an ignition generator coil connected in electrical communication with the magneto, comprising the steps of:

providing an ignition generator coil interrupt circuit electrically connected to the ignition generator coil, the circuit for selectively interrupting power to the ignition generator;

mounting the ignition generator coil interrupt circuit directly within the housing;

providing switch means connected to the circuit for allowing power interruption to the ignition generator coil; and activating the switch means to interrupt power to the ignition generator coil and disabling engine starting.

Generally speaking, the vehicles incorporating stator/magneto arrangements include watercraft, all terrain vehicles, snowmobiles, among others.

As a particular convenience, the switch means may be selected from any suitable switching devices, such as mechanical, electrical, electromechanical, electronic (digital) arrangements. The important feature is that the circuit (supra) is positioned within the housing as opposed to externally, this latter arrangement is what limited the effectiveness of the prior art.

Another object of one embodiment of the present invention is to provide an arrangement for preventing unauthorized access to a vehicle, comprising:

a vehicle, the vehicle having a power source, a magneto and a stator housed within a housing and an ignition generator coil in electrical communication with the magneto;

an ignition generator coil interrupt circuit electrically connected to the ignition generator coil, the circuit for selectively interrupting power to the ignition generator, the circuit positioned directly within the housing; and switch means connected to the circuit for allowing power interruption to the ignition generator coil for disabling the motor.

Mounting location for the circuit is conveniently anywhere within the housing with a suitable connection to the ignition generator coil. As a useful position, the circuit may be positioned between the stator and magneto.

A still further object of one embodiment of the present invention is to provide an assembly for use with a vehicle having a motor, a power source for the motor, a magneto, a stator and an ignition generator coil in electrical communication with the magneto, the assembly for preventing unauthorized access to a vehicle, comprising:

a stator plate;

mounting means on the stator plate for mounting the ignition generator coil;

circuit means for selectively interrupting power to the ignition generator coil, the circuit configured for positioning on the stator plate; and switch means connected to the circuit for allowing power interruption to the ignition generator coil for disabling the motor.

In the embodiment-noted above, the assembly could be provided as a kit for retrofit applications and easily be used for watercraft, snowmobiles, all terrain vehicles, inter alia.

As a further object of one embodiment of the present invention, there is provided a method for preventing unauthorized access to a vehicle having an,engine and block therefor, sensors for effecting engine activation, a power source, ignition coils, and means for establishing electrical communication between the sensor and the coils, the method comprising the steps of:

providing switch means for interrupting power delivery to the sensors;

positioning the switch means between at least one sensor of the sensors and the means for establishing electrical communication between the sensors and the coils;

mounting the switch means to the at least one sensor; and activating the switch means to interrupt power delivery to the sensors.

The means for establishing electrical communication between the sensors and coils is known in the art as an ECM motherboard. In current arrangements the ECM motherboard in automobiles is externally mounted of the engine and thus is vulnerable to tampering. If removed and replaced with a similar component not equipped with a theft deterrent (immobilizer) auto theft is easily achieved.

By providing the switch arrangement and mounting location, the presence of an immobilized ECM motherboard is of no consequence; the arrangement discussed supra interrupts power to the sensors leading to the ECM motherboard and further is mounted at least partially within the engine block to avoid tampering, bypass or expeditious removal.

As a particularly attractive advantage, the switch means may be integrally mounted to the sensor or a plurality of sensors. By providing several such switches, security for preventing unauthorized access may be augmented.

It will be readily apparent to those skilled that the vehicles having stator/magneto arrangements could easily be adopted to the circuit mentioned above where the stator/magneto is removed in future modifications of such vehicles.

Having thus described the invention, reference will now be made to the accompanying drawings illustrating preferred embodiments.

BRIEF DESCRIPTION OF THE DRAWINGS

Similar numerals in the figures denote similar elements.

DETAILED DESCRIPTION OF THE PREFERRED EMBODIMENTS

Figure 1:
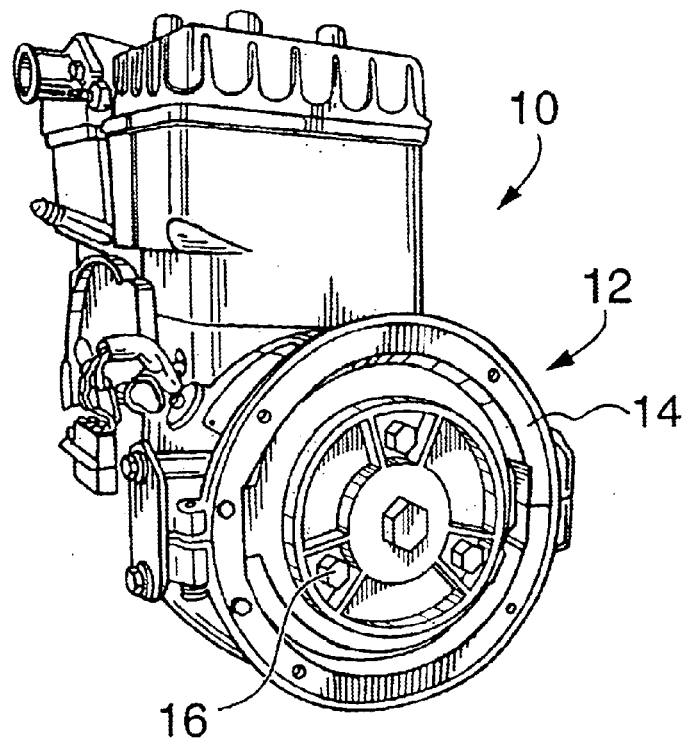
FIG. 1 is a perspective view of a typical engine of the vehicles set forth herein.

Referring now to the drawings and particularly FIG. 1, numeral generally references the engine. There is provided a housing 12 for housing the magneto and stator.

A cover 14 is fixed by fasteners 16 to provide a sealed stator/magneto housing. As is generally known, specialized tools and skill are required to remove the cover 14 and eventually gain access to the interior of the housing 12.

Figure 2:
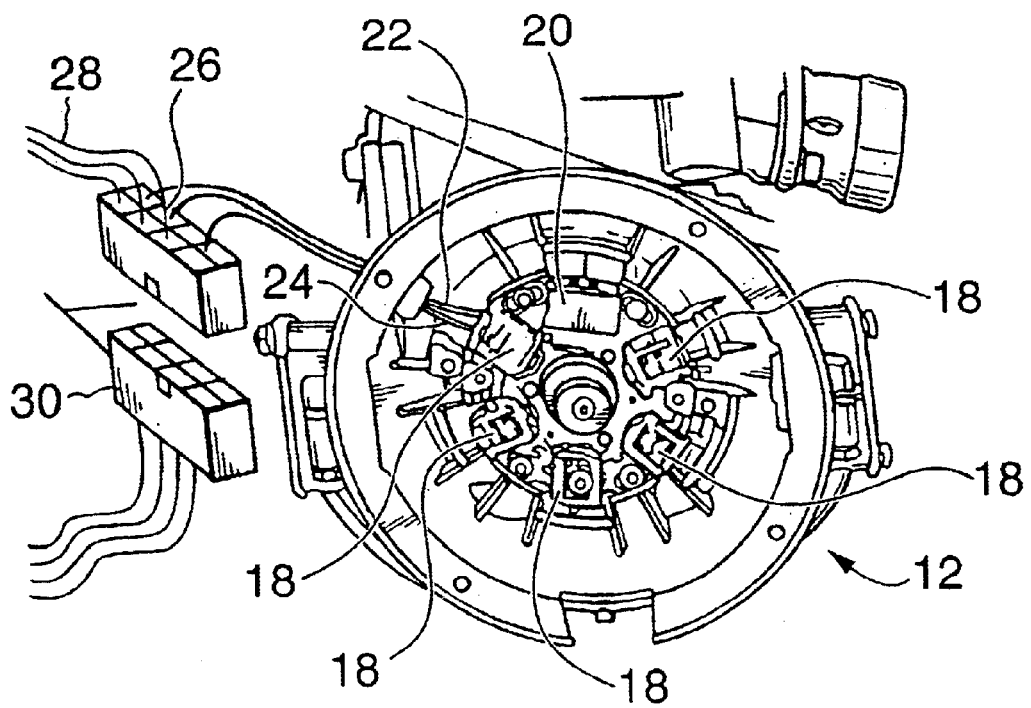
FIG. 2 is a view similar to FIG. 1 with the cover removed from the stator housing.

FIG. 2 illustrates the interior of the housing 12 where there are mounted several coils 18, shown in the example as a quantity of five. A main coil or ignition generator coil 20 is also provided and is integral in starting the engine. It is known that such coils generally operate on the principle of sensors. Coil has two leads 22 and 24 which terminate at a block connector 26. Block connector 26 also includes leads, generally referenced by numeral 28, leading to the CDI box (not shown). A mating block connector connects to block connector 26 and the former provides leads to the ignition switch, kill switch and power accessories (none of which is shown) of the vehicle (not shown).

The arrangement is generally well known in the art. Unfortunately, it is also well known that by simply disconnecting the block connectors 26 and 30, all security systems typically associated with the vehicle are disabled while a signal is still capable of being supplied to the CDI box from the ignition generator coil 20. Accordingly, the vehicle will start in this condition.

Figure 3:
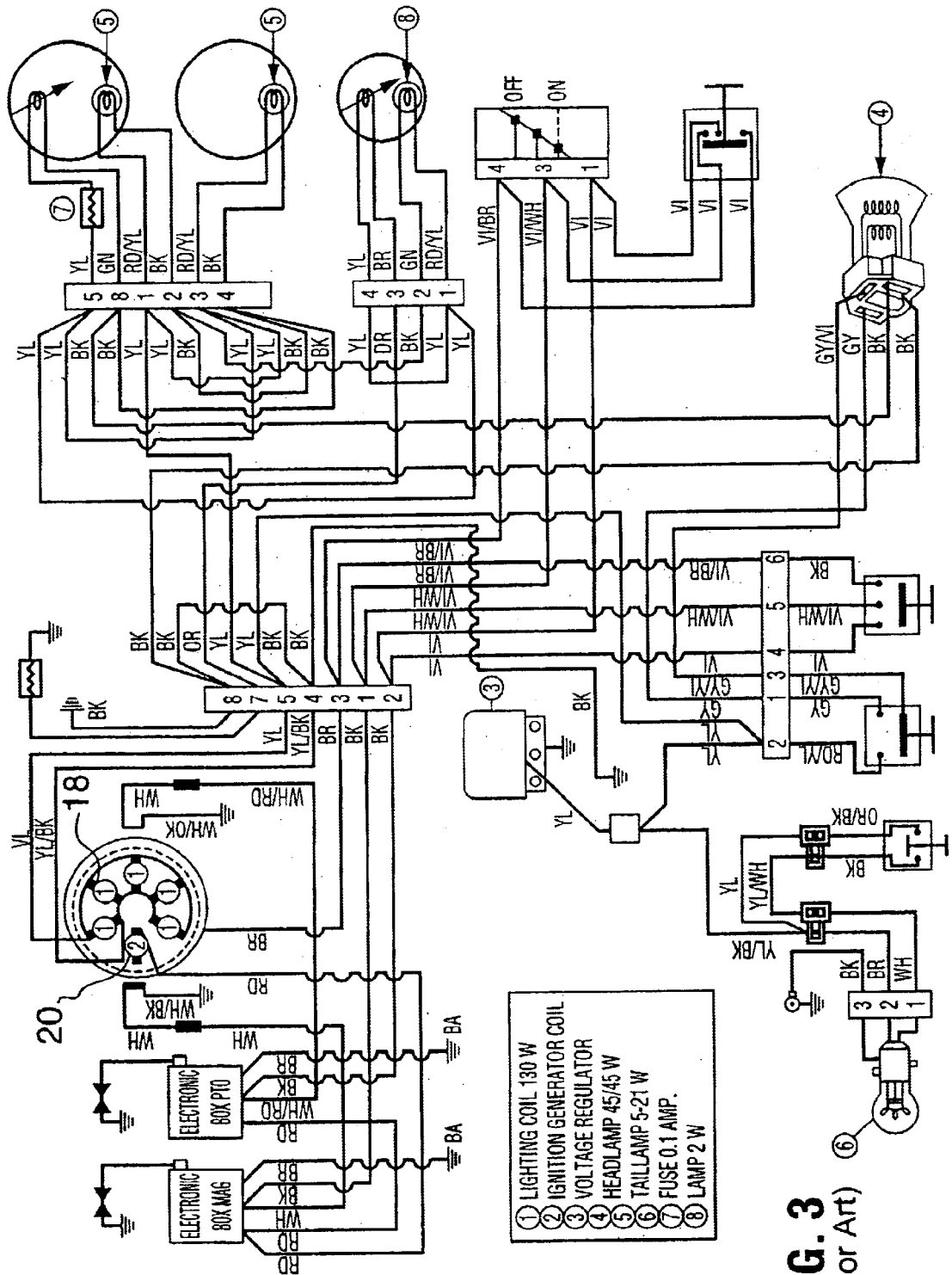
FIG. 3 is a schematic diagram of the wiring of a typical snowmobile.

FIG. 3 illustrates a typical schematic diagram for a conventional snowmobile, although the diagram is applicable to typical magneto/stator motors. As the diagram illustrates, the disposition of the ignition generator coil in the circuit facilitates easy starting of the engine when the block connectors 26 and are disconnected.

Figure 4:
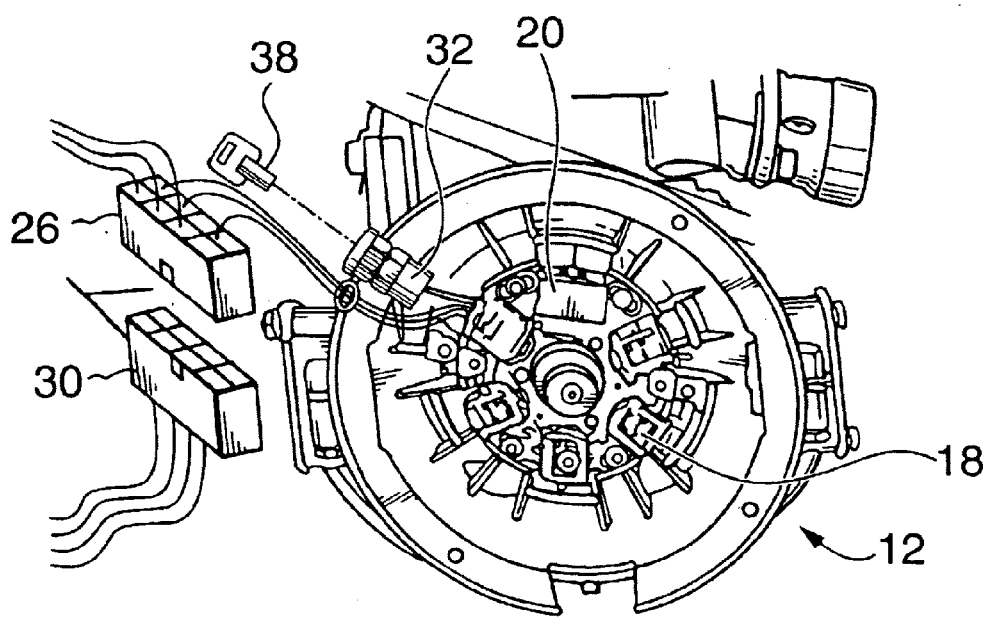
FIG. 4 is a view similar to FIG. 2 with the arrangement according to one embodiment installed.
Figure 5:
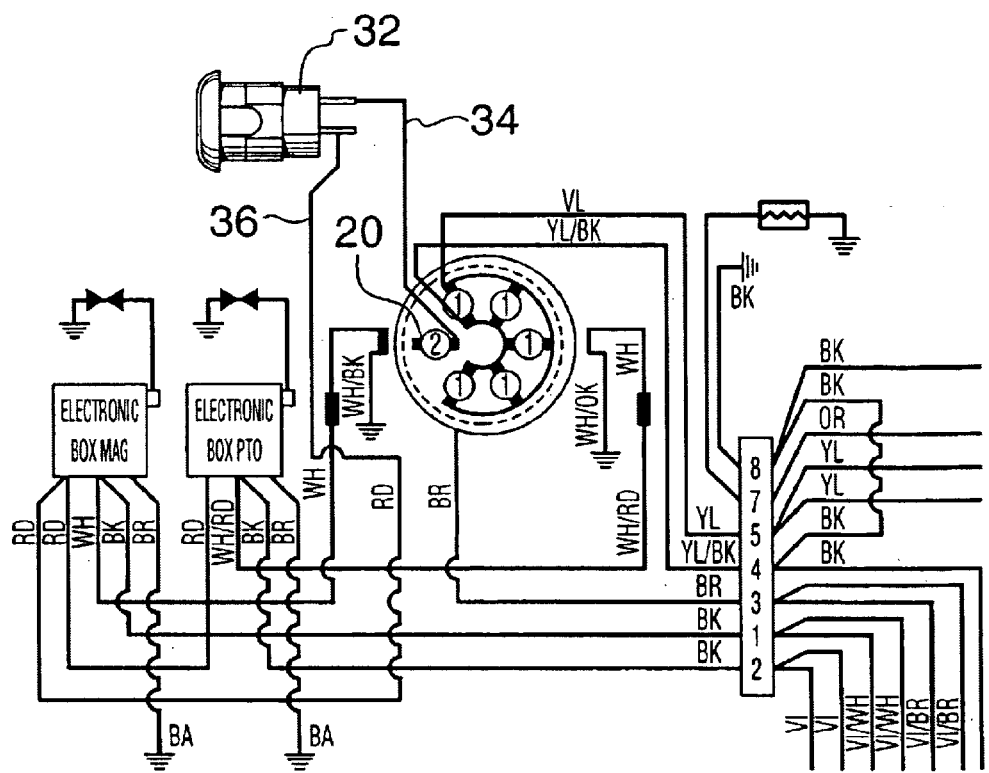
FIG. 5 is an abbreviated schematic diagram illustrating the positioning of the elements according to one embodiment of the present invention.

FIG. 4 illustrates an example of the invention as positioned within the housing 12. A switch 32 is disposed in housing 12 and in this case is an electrical/mechanical switch. FIG. 5 illustrates a truncated schematic of the circuit of FIG. 4 showing the positioning of the switch 32 and its relationship to ignition generator coil 20. As illustrated, the switch 32 includes leads 34 and 36, with lead 34 being connected to Ignition generator coil and lead 36 extending to other electrical connections related to starting the vehicle. By connection to ignition generator coil 20, the circuit is interrupted in the OFF position and is unaffected by disconnection of block connectors 26 and 30. Accordingly, the user, in order to start the ignition generator coil 20, the circuit is interrupted In the OFF position and is unaffected by disconnection of block connectors 26 and 30. Accordingly, the user, in order to start the vehicle must initially actuate the switch 32 into the ON position with, for example, a key 38 which, in turn, will re-enable the ignition generator coil 20. Once this is done, normal procedures may be performed to start the vehicle.

In the embodiment of FIG. 4, a switch is mounted in the housing 12 adjacent the ignition generator coil 20. This is not essential. In the situation where the switch system comprises a remotely controllable arrangement, the switch may be replaced by a receiver (not shown) well known In the art. In these devices an antenna can be positioned in any convenient location provided it can communicate with a transmitter (not shown). It will be appreciated to those skilled in the art that any suitable switch capable of selectively interrupting the Ignition generator coil circuit may be used.

Advantageously, by positioning the circuit interrupt portion of the switch within the housing, tampering or bypass is difficult, tedious and would more than likely damage the vehicle if a thief attempted any tampering. Further, if the switch mechanism is damaged, broken or removed, the vehicle cannot be made to start unless original wiring is restored. Cover 14 is removed and the switch 32 removed from the vehicle. This is obviously time consuming and cannot be performed with any degree of stealth.

Figure 7:
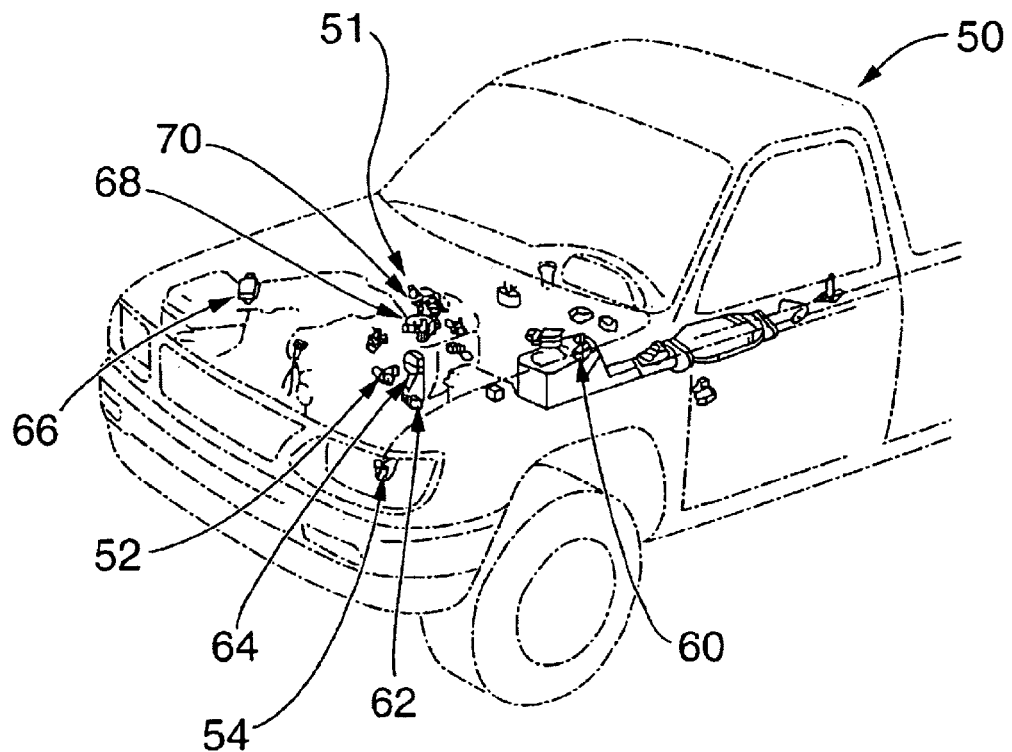
FIG. 7 is a schematic illustration of a vehicle and positioning of various sensors.

In FIG. 7, a vehicle 50 is shown and includes an engine and an engine block, broadly denoted by numeral 51. As is known, a number of sensors are required to carry out various functions with respect to the operation of the vehicle. In the example, numeral 52 represents a camshaft position sensor, numeral 54 represents a crankshaft position sensor and numerals 56 through 70 represent other sensors, amplifiers, inter alia.

As is illustrated in FIG. 67, disposed between engine 51 and sensors 52 through 70 is a switch 51'. The sensors 52 through 70 are in electrical communication with an ECM motherboard 72 which is responsible for numerous functions, the most Important of which for purposes of this discussion is communication between the sensors and ignition coils 74 and 76. As is known, coils 74 and 76 each communicate with cylinders 78, 80, 82, and 84, respectively.

By providing power interruption via switch 51 to the sensors 52 through 70, the ECM motherboard 72 is inconsequential as to whether the ECM motherboard 72 is equipped with anti-theft provisions such as an immobilizer (not shown). This is a significant advantage since the sensors are effected by the switch 51' as opposed to the ECM motherboard 72. By effecting the sensors 52 through 70, the ECM motherboard 72 is also effected. This is a more effective system since it does not matter whether the ECM motherboard includes ante theft provisions.

Figure 6:
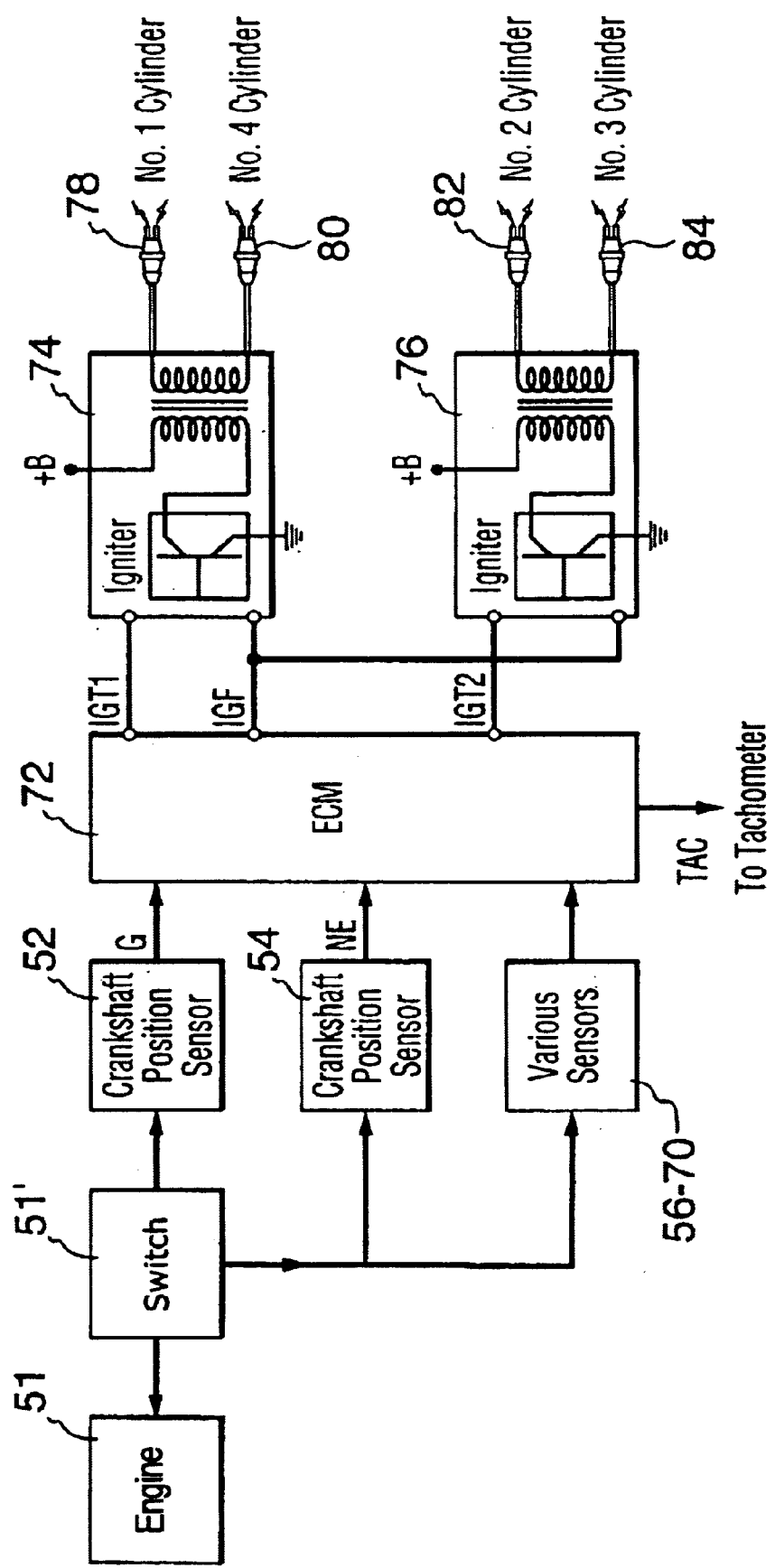
FIG. 6 is a schematic diagram of the starting circuit for an automobile with the switch.

The sensors, and particularly those shown in FIG. 6, i.e. sensors 52 and 54 are typically at least partially mounted within the engine block 51 as is generally depicted in FIG. 7. By connecting the switch 51' to all or some of the sensors 52 through 70, the switch is therefore at least partially mounted in the engine block 51 and therefore present significant difficulty for potential thieves to tamper with the arrangement. This is in marked contrast to the disposition of the ECM motherboard 72 which is easily accessible.

Figure 8:
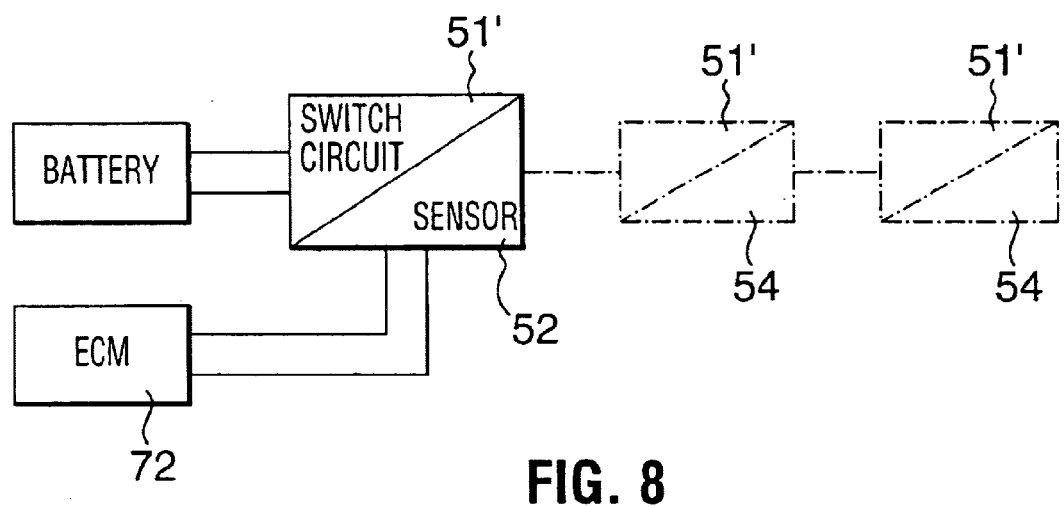
FIG. 8 is a schematic diagram of the switch arrangement in relation to the sensor(s) and ECM motherboard.

In this manner, the sensors 52 through 70 and the switch 51 (of which there may be several) can be Integrated as a single unit. This arrangement is shown in FIG. 8 where the switch 51 and sensor 52 are unified as a single unit. FIG. 8 also shown in dashed line the possibility of augmenting security by linking various switches and sensors In tandem.

Although embodiments of the invention have been described above, it is not limited thereto and it will be apparent to those skilled in the art that numerous modifications form part of the present invention insofar as they do not depart from the spirit, nature and scope of the claimed and described invention.

I claim:

1. A method for preventing unauthorized access to a vehicle having a motor, a power source for said motor, a magneto and a stator housed within an engine housing and an ignition generator coil connected in electrical communication with said magneto, said engine housing within an engine compartment, comprising the steps of:
   providing an ignition generator coil interrupt circuit electrically connected to said ignition generator coil, said circuit for selectively interrupting power to said ignition generator;
   mounting said ignition generator coil interrupt circuit directly within said engine housing;
   providing switch means mounted within said engine housing and connected to said circuit for allowing power interruption to said ignition generator coil; and
   activating said switch means to interrupt power to said ignition generator coil and disabling engine starting.

2. The method as set forth in claim 1, wherein said ignition generator coil interrupt circuit is mounted between said stator and said magneto.

3. The method as set forth in claim 1, wherein said ignition generator coil interrupt circuit is mounted adjacent said ignition generator coil.

4. The method as set forth in claim 1, including the step of providing an opening in said housing for providing access for said switch means to said ignition generator coil interrupt circuit.

5. An arrangement for preventing unauthorized access to a vehicle, comprising in combination:
   a vehicle, said vehicle having a power source, a magneto and a stator housed within an engine housing and an ignition generator coil in electrical communication with said magneto, said engine housing mounted within an engine compartment;
   an ignition generator coil interrupt circuit electrically connected to said ignition generator coil, said circuit for selectively interrupting power to said ignition generator, said circuit positioned directly within said engine housing; and
   switch means connected to said circuit within said housing for allowing power interruption to said ignition generator coil for disabling said motor.

6. The combination as set forth in claim 5, wherein said ignition generator coil interrupt circuit is positioned within said housing between said stator and said magneto.

7. The combination as set forth in claim 5, wherein said circuit is positioned adjacent said ignition generator coil.

8. The combination as set forth in claim 5, wherein said circuit is positioned between said ignition generator coil and circuitry for starting said motor.

9. The combination as set forth in claim 5, wherein said stator includes a stator plate.

10. The combination as set forth in claim 9, wherein said circuit is mounted on said stator plate.

11. The combination as set forth in claim 5, wherein said switch means comprises remote control switch means.

12. The combination as set forth in claim 11, wherein said remote control switch means includes a transmitter and a receiver, said receiver being mounted to said circuit.

13. The combination as set forth in claim 5, wherein said switch means includes a digitally encoded key and a circuit to communicate with said key.

14. The combination as set forth in claim 5, wherein said switch means comprises a combined electrical/mechanical keylock switch mounted to said housing in electrical communication with said circuit.

15. The combination as set forth in claim 5, wherein said vehicle is selected from the group consisting of an all terrain vehicle, a motorcycle, a snowmobile and a watercraft.

16. An assembly for use with a vehicle having a motor, a power source for said motor, a magneto, a stator, a stator housing and an ignition generator coil in electrical communication with said magneto, said assembly for preventing unauthorized access to a vehicle, comprising:

a stator plate;

mounting means on said stator plate for mounting said ignition generator coil;

circuit means mounted within said stator housing for selectively interrupting power to said ignition generator coil, said circuit configured for positioning on said stator plate; and switch means connected to said circuit within said housing for allowing power interruption to said ignition generator coil for disabling said motor.

17. The assembly as set forth in claim 16, where said circuit means is positioned on said stator plate between said plate and said ignition generator coil.

18. The assembly as set forth in claim 17, wherein said vehicle is selected from the group consisting of snowmobiles, watercrafts, all terrain vehicles and motorcycles.

19. A method for preventing unauthorized access to a vehicle having an engine and block therefor, sensors for effecting engine activation, a power source, ignition coils, and means for establishing electrical communication between said sensor and said coils, said method comprising the steps of:

providing switch means for interrupting power delivery to said sensors;

positioning said switch means between at least one sensor of said sensors and said means for establishing electrical communication between said sensors and said coils;

mounting said switch means to said at least one sensor; and activating said switch means to interrupt power delivery to said sensors.

20. The method as set forth in claim 19, wherein said sensors are mounted at least partially in said block of said engine.

21. The method as set forth in claim 20, wherein said switch means is mounted directly to said at least one sensor.

22. The method as set forth in claim 19, wherein said switch means is portioned within said engine block.

23. The method as set forth in claim 19, wherein said sensors are positioned within said engine block.

* * * * *